United States Patent [19]

Jones et al.

[11] Patent Number: 4,505,940

[45] Date of Patent: Mar. 19, 1985

[54] NON-CAFFEINE SOLIDS RECOVERY PROCESS

[75] Inventors: Gary V. Jones, Tarrytown, N.Y.;
James F. Meinhold, Boonton, N.J.;
Joseph A. Musto, Bronx, N.Y.

[73] Assignee: General Foods Corporation, White Plains, N.Y.

[21] Appl. No.: 594,460

[22] Filed: Mar. 29, 1984

[51] Int. Cl.³ ............................................... A23F 5/22
[52] U.S. Cl. ..................................... 426/424; 544/274
[58] Field of Search .......................... 544/274; 426/424

[56] References Cited

U.S. PATENT DOCUMENTS

| | | | |
|---|---|---|---|
| 2,472,881 | 6/1949 | Bender | 426/428 X |
| 2,508,545 | 5/1950 | Shuman | 544/274 |
| 2,933,395 | 4/1960 | Adler et al. | |
| 4,409,253 | 10/1983 | Morrison et al. | 426/424 |

FOREIGN PATENT DOCUMENTS 865488 10/1978 Belgium .
1591756 11/1968 France .

Primary Examiner—Joseph Golian
Attorney, Agent, or Firm—Basam E. Nabulsi; Thomas R. Savoie; Daniel J. Donovan

[57] ABSTRACT

An improved roast and ground coffee extract decaffeination method which involves partitioning non-caffeine solids from caffeine and returning the non-caffeine solids to a decaffeinated coffee product for improved flavor and economics. Liquid-liquid extraction is used to partition the non-caffeine solids into an aqueous phase from a caffeine-solvent phase. Caffeine is recovered from the caffeine-solvent phase as a valuable by-product.

5 Claims, No Drawings

4,505,940

NON-CAFFEINE SOLIDS RECOVERY PROCESS

TECHNICAL FIELD

The present invention relates to the field of decaffeinating caffeine-containing liquids, and particularly aqueous coffee extracts. More particularly, this invention relates to improving the quality and the economics of such a system by retaining in a decaffeinated soluble coffee product the non-caffeine soluble coffee solids which are removed from the aqueous coffee extract in the decaffeination step.

BACKGROUND ART

Decaffeinated instant or soluble coffees represent a significant segment of the coffee market. There are many techniques disclosed in the art for making such products. The preferred techniques will be those that produce a high quality product and are economical to operate. The speed with which the decaffeination is effected and the degree to which caffeine is selectively removed during the decaffeination step are both factors in determining the quality and cost of these systems.

The removal of caffeine from green coffee beans is a technique which has been widely practiced in the art; however, this process requires several hours and involves high temperatures. The removal of caffeine from aqueous coffee extract has been recognized as providing a relatively rapid caffeine extraction step at relatively lower temperatures. The latter process also results in a higher yield and reduced operating costs when compared to the decaffeination of green coffee beans.

Decaffeination of aqueous coffee extract with a water-immiscible organic solvent is normally referred to as liquid-liquid extraction. In such a decaffeination process, roast and ground coffee extract is normally flowed countercurrently to the organic solvent. The solvent removes the caffeine from the coffee extract to provide a decaffeinated extract. The decaffeinated extract is stripped of residual solvent and then processed further to form a decaffeinated instant coffee product. See U.S. Pat. No. 2,933,395 to Adler et al., issued Apr. 19, 1960, which discloses a countercurrent extract decaffeination process.

Direct decaffeination of roast and ground coffee extract can be an effective and efficient method for removing caffeine from the coffee. For example, in countercurrent extract decaffeination, the coffee extract is usually dispersed in the form of small droplets through a continuous solvent phase. The small droplets present a large surface area to the solvent. Because of the large surface area, mass transfer of caffeine from the coffee extract to the solvent is significantly increased. Because of the increased mass transfer, extract decaffeination can become a truly continuous decaffeination process.

While techniques for decaffeinating roasted coffee extracts are more efficient than methods for decaffeinating green coffee beans, there remain certain drawbacks to the former techniques. One such drawback is that the organic solvents used for caffeine extraction do not extract only caffeine from the coffee extract stream. The use of a highly selective solvent (i.e., a solvent which removes only caffeine from the coffee material) would, of course, be highly desirable. However, caffeine solvents presently available for conveniently removing caffeine from coffee extract unavoidably remove some non-caffeine solids from the extract along with caffeine. The failure to recover these non-caffeine solids by returning them in some manner to the dried coffee product necessarily results in a loss of coffee flavor and a reduction in the economic efficiency of the overall process.

In the absence of a highly selective liquid solvent, there have been prior attempts to separate the material removed from the coffee extract into caffeine-rich and essentially caffeine-free solvent fractions. The caffeine-free fraction would then be added back to the coffee extract stream to recover these valuable non-caffeine solids. The caffeine-rich fraction would be removed from the decaffeination system as a waste stream, although the caffeine may desirably be isolated and sold as a valuable by-product of the decaffeination process. One such caffeine recovery method is disclosed in U.S. Pat. No. 2,508,545 to Shuman. Another such method is disclosed in U.S. Pat. No. 2,472,881 to Bender.

Attention in the field has only recently been directed toward the recovery of these important non-caffeine solids. For example, Belgian Pat. No. 865,488 of Bolt et al., issued Oct. 2, 1978, describes a process wherein the coffee extract is first decaffeinated with a water-immiscible organic solvent; the organic solvent is then contacted with water to transfer the caffeine and unavoidably, some non-caffeine solids; the decaffeinated solvent is returned to the coffee extract; residual solvent is stripped therefrom; and the caffeine is crystallized from the water phase, which is then discarded. The water phase inevitably contains some non-caffeine solids which would contribute important body notes to the soluble coffee but are instead discarded. A similar though supposedly improved method is disclosed in U.S. Pat. No. 4,409,253 to Morrison et al. The improvement consists of recycling the water phase from which the caffeine has been crystallized back to the original caffeine-containing extract. The water phase apparently cannot be combined with the decaffeinated extract because the crystallization leaves substantial caffeine in the water. Hence, the inefficient recycle of the water phase through the decaffeination step is disclosed, with the accompanying increase in the amount of caffeine to be removed.

A different approach has been disclosed, French Pat. No. 1,591,756 to Societe des Produits Nestle S.A., whereby coffee extract is stripped and then decaffeinated with the solvent ethyl acetate; the caffeine-containing ethyl acetate is simultaneously contacted with water and water-saturated ethyl acetate to transfer the caffeine to the water; the caffeine is then crystallized from the water phase which contains no non-coffee solids according to the disclosure; the caffeine-free ethyl acetate is passed through an evaporation step which serves to separate the solvent from the non-caffeine solids and aromatic components; the non-caffeine solids and aromatic components are dissolved in ethyl alcohol and added back to the decaffeinated extract which subsequently passes through a stripping step to remove traces of ethyl acetate. The method is restricted to ethyl acetate for the decaffeination of coffee extracts and trichloroethylene for tea extracts.

It is an object of the present invention to provide a roasted coffee extract decaffeination method which produces a soluble coffee of improved flavor.

It is another object of the present invention to increase the total coffee solubles yield of an extract decaffeination process.

It is a further object of the present invention to provide an efficient means for partitioning non-caffeine solids from caffeine and recovering the non-caffeine solids in the finished coffee product without requiring the recycle of the addback stream through the decaffeination step.

These and other objects of the present invention are disclosed hereinafter.

SUMMARY OF THE INVENTION

It has now been found that the objects of the invention are met by a roast and ground coffee extract decaffeination method which involves first contacting the extract and a caffeine solvent so that at least 90%, and preferably at least 95% by weight of the caffeine and a lesser proportion of non-caffeine solids are transferred to the solvent, generally the ratio of caffeine to non-caffeine solids in the solvent being from about 1.5:1 to about 6:1 by weight. After separation, the then caffeine-containing solvent is contacted with water to form an aqueous phase containing at least 70%, and preferably at least 90% by weight of the available non-caffeine solids and a solvent phase which retains at least 80% and preferably more than 90% by weight of the extracted caffeine. After separation of these two phases, the non-caffeine solids have effectively been partitioned from the caffeine and the aqueous stream containing said non-caffeine solids is added back to the decaffeinated coffee extract. The aqueous stream which contains the non-caffeine solids, and the decaffeinated extract stream are either independently stripped of residual solvent or are combined and together stripped of residual solvent. The caffeine-containing solvent is further processed to recover the caffeine as a valuable by-product according to existing methods.

Roast and ground coffee extracts are decaffeinated by the method of the present invention. Roast and ground coffee extracts derived from commercial coffee extraction systems such as those wherein roast and ground coffee is extracted with water in a multi-stage countercurrent extraction battery are among those suitable for the present invention. Much of the coffee flavor and aroma contained in the roast and ground coffee is thereby extracted to the coffee extract stream and it may be desirable to strip all or a portion of these aromas from the coffee extract prior to contact with the caffeine solvent. Conventional stripping techniques as are known in the art are suitable.

Whether or not the roast and ground coffee extract is first stripped of the volatile flavor and aroma compounds, the coffee extract is contacted with a caffeine solvent. Generally, extract decaffeination involves liquid-liquid extraction wherein the coffee extract is contacted with a water-immiscible organic solvent to remove caffeine from the coffee extract, either continuously or in a batch system. A variety of water-immiscible organic solvents, generally divided into halogenated and nonhalogenated solvents, are known for caffeine extraction, with the preferred caffeine solvents having a relatively low miscibility with water and being relatively specific for caffeine. The present invention has however been found to be restricted to halogenated solvents. Of the suitable halogenated solvents such as chloroform, dichloroethylene, trichloroethylene, and the like, methylene chloride is particularly well-suited for the decaffeination of coffee extract and is relatively inexpensive and readily available.

DESCRIPTION OF THE PREFERRED EMBODIMENTS

Extract decaffeination by liquid-liquid extraction may be conducted in any apparatus that provides efficient liquid-liquid contact. An agitated batch tank is suitable or a continuous apparatus such as a rotating disc contactor column or a reciprocating plate column such as a Karr Column may be employed. It is desirable to conduct the extract decaffeination with as low a solvent-to-coffee extract ratio as is practicable. The solvent-to-extract ratio employed is typically determined by the degree of decaffeination required, the soluble solids concentration of the roasted coffee extract feed, the caffeine solvent used, the temperature of operation, and the effectiveness of the solvent-coffee extract contact. By utilizing the lowest solvent-to-extract ratio practicable, it is possible to effect the necessary degree of decaffeination while minimizing the amount of non-caffeine solids removed from the coffee extract stream. Generally, the liquid-liquid extraction is operated in a range of from about 26.7° C. (80° F.) to about 82.2° C. (180° F.), and typically for methylene chloride from about 37.8° C. (100° F.) to about 43.3° C. (110° F.). Generally, it has been found that a range of from about 1:1 to about 10:1 caffeine solvent to roasted coffee extract by weight is sufficient to remove at least 90% by weight of the caffeine contained in a coffee extract having between 10% and 50% by weight coffee solids and up to 5% caffeine by weight. A suitable range for methylene chloride decaffeination is from about 2:1 to about 6:1 methylene chloride to coffee extract by weight. A preferred ratio for methylene chloride when decaffeinating an extract stream having a concentration of about 25% to about 30% soluble solids is from about 3.5:1 to 5:1 methylene chloride to coffee extract by weight. In this weight ratio range, it is possible to extract better than 97% of the caffeine initially present in the coffee extract.

In the case of a continuous liquid-liquid extractor, the denser of the two liquids enters the top of the column, passes therethrough, and is removed from the bottom of the column. The less dense liquid is fed to the bottom of the column, passes therefrom, and is removed at the top of the column. The roasted coffee extract is typically fed to the bottom of the column and maintained as the dispersed phase in the continuous solvent extracting phase. The separation of these two phases is effected by the continuous operation of the column. In addition, centrifugation of the exit streams or long settling zones may be preferred to remove entrained caffeine solvent from the coffee extract, and entrained coffee extract from the caffeine solvent. The caffeine solvent exiting the liquid-liquid extractor typically contains anywhere from about 0.1% to 1.0% by weight caffeine, and a ratio of from about 1.5:1 to about 6:1 caffeine to non-caffeine solids by weight. Prior to further processing of this caffeine solvent stream, it may be desirable to concentrate the stream by means of evaporation so as to reduce the volume of solvent to be handled downstream.

Although a large measure of the volatile flavor and aroma compounds from the roasted and ground coffee can be retained by stripping the coffee extract prior to caffeine solvent contact, said stripping techniques do not recover non-volatile body notes which are contained to a large degree in the aforementioned non-caffeine solids. The present invention teaches the recovery of said non-caffeine solids in an aqueous stream which may be added back directly to the decaffeinated extract without significantly increasing the weight percent of caffeine in the decaffeinated extract stream. The present invention thus provides an extremely efficient means of recovering non-caffeine solids without requiring a second decaffeination of the aqueous stream cointaining the non-caffeine solids prior to addback to the decaffeinated extract, as in the prior art, U.S. Pat. No. 4,409,253 to Morrison et al. A further important improvement in the present invention is that the non-caffeine solids are recovered in an aqueous stream rather than in a solvent stream as in the Morrison et al. patent, thus greatly reducing the degree of solvent stripping required after the addback, such as in Belgium Pat. No. 865,488 to Bolt et al. and French Pat. No. 1,591,756 assigned to Nestles-S. A. The decaffeinated extract with non-caffeine solids added back may be further processed as by concentrating stripped volatile flavor and aroma addback, freeze-drying, spray-drying and agglomeration.

According to the present invention, the caffeine-containing solvent enters a second liquid-liquid extraction step which, similar to the initial liquid-liquid extraction, may be conducted in an agitated batch tank or a continuous apparatus such as a Karr Column. For a continuous application of the present invention, the water acts as the continuous phase, while the caffeine-containing solvent is dispersed within said water. The caffeine-containing solvent typically enters the top of the apparatus, passes therethrough, and exits the bottom. Water, the phase into which the non-caffeine solids are to be extracted, enters the bottom of the apparatus, passes therefrom and exits the top. The operating conditions of the liquid-liquid extractor are determined, within certain specified ranges, based upon the degree to which it is desired to transfer the non-caffeine solids from the caffeine-containing solvent to the water phase. The present invention is preferably operated so as to recover at least 70% of the non-caffeine solids in the aqueous phase while retaining at least 90% of the caffeine in the solvent phase.

The liquid-liquid extractor is operated under a slight positive pressure in order to maintain the caffeine-solvent in the liquid state. The weight ratio of water to caffeine-containing solvent may range from about 0.25:1 to about 3:1 in the liquid-liquid extractor. Typically, for methylene chloride as the solvent, a water-to-solvent ratio of from about 0.5:1 to about 1:1 by weight is optimal for transferring at least 70% of the non-caffeine solids to the aqueous phase while retaining at least 90% of the caffeine in the solvent. The temperature for extractor operation may range from about 5° C. (41° F.) to about 43.3° C. (110° F.) for selective transfer of the non-caffeine solids. It is preferable to operate the extractor at a temperature of from about 25° C. (77° F.) to about 30° C. (86° F.). The means of agitation is necessarily dependent upon the type of liquid-liquid extractor employed, but the degree of agitation must be sufficient to effect the desired non-caffeine solids transfer but prevent flooding. For example, an agitation of from about 100 to about 120 strokes per minute (spm) is proper when operating a pilot-scale Karr Column to effect at least a 70% or greater transfer of non-caffeine solids to the aqueous phase.

The aqueous phase which contains the non-caffeine solids may be added to the decaffeinated extract or further processed prior to addback. Typical processing steps prior to addback include stripping residual solvent from the aqueous phase, concentrating the aqueous phase to a higher non-caffeine solids concentration, and mixing of the aqueous phase after residual stripping with volatile aromas stripped from the roast and ground coffee extract. These intermediate processing steps are not mutually exclusive and may be performed in any combination.

Residual solvent may be stripped from the aqueous phase by any art-recognized technique such as flash evaporation. Said solvent stripping may be effected in either a batch or a continuous system. Typically, residual solvent is flashed under a vacuum of from about 5" Hg to about 27" Hg and at a temperature of from about 43.3° C. (100° F.) to about 96.1° C. (205° F.) and is condensed in a condensing heat exchanger. The condensed solvent may be recycled to the decaffeination process or discarded. In processing schemes wherein residual solvent is stripped from the aqueous phase as described above, the decaffeinated extract is similarly and separately stripped of residual solvent. This is advantageous so that after the aqueous phase containing the non-caffeine solids and the decaffeinated extract are combined, the total residual solvent in the combined stream is less than 10 ppm and further solvent stripping is unnecessary.

Concentration of the aqueous phase to a higher non-caffeine solids concentration may be used to reduce the amount of water to be handled during further processing. Evaporation and freeze concentrating are two suitable methods that may be employed. The aqueous phase may be combined with volatile aromas stripped from the roast and ground extract, but typically only in processing systems wherein further stripping, such as residual solvent stripping, or concentrating, such as evaporation, are not included downstream. Said volatile aromas may first be fractioned in a distillation column. Typically, the fractioned aromas that are recovered at the top of the distillation column are mixed with the aqueous phase. The amount of aromas mixed with the aqueous phase is determined by the target flavor for the finished coffee product, and is dependent upon the amount of strip taken from the roast and ground coffee extract, the degree of fractionation in the distillation column, and the ratio at which the combined aqueous phase is to be added to the decaffeinated extract.

Addback of the aqueous phase to the decaffeinated extract may be completed either continuously or in a batch fashion. The level at which the aqueous phase is added to the decaffeinated extract is dependent upon many factors, including the concentration of the non-caffeine solids, the concentration of the decaffeinated extract, and the target flavor for the finished coffee product. Typically however, the aqueous phase is added at a level such that the ratio of the soluble coffee solids to the non-caffeine solids in the combined stream is from about 50:1 to about 85:1 by weight. In this typical range, the non-caffeine solids are effectively added back to the soluble coffee solids at a level such that the combined stream has a weight ratio which corresponds to the original weight ratio in the undecaffeinated roast and ground coffee extract.

The combined decaffeinated extract stream may be further processed as, for example, by concentration; volatile aroma addback; spray during and agglomeration; or freeze-drying. It may also be aseptically packaged as a liquid coffee extract. Such further processing steps may be carried out according to conditions and specifications as are known in the prior art.

The caffeine-containing solvent from which the non-caffeine solids have been removed exits the second liquid-liquid extractor very nearly free of non-caffeine solids. The solvent stream may now pass through a series of processing steps to recover the caffeine as a valuable and relatively pure by-product. Any of the art-recognized methods for recovering caffeine from a caffeine solvent may now be employed. It may be desirable to remove any entrained water from this solvent stream prior to caffeine recovery depending on the caffeine recovery method to be used. Water may be removed by any suitable separation method such as centrifugation. Further, if the caffeine-containing solvent stream was not concentracted prior to liquid-liquid contact with water, such concentration may be effected prior to caffeine recovery so as to minimize the amount of solvent that must be handled and increase the driving force for caffeine mass transfer.

Caffeine may be partitioned from the caffeine solvent by again contacting the solvent with water, for example, in any apparatus that provides efficient liquid-liquid contact. A particularly suitable method for the recovery of caffeine is disclosed in U.S. Pat. No. 2,508,545 to Shuman. In this method, the caffeine is redissolved in water in any suitable manner, such as liquid-liquid extraction or distilling off the caffeine solvent as in an evaporator or a steam still. The resulting caffeine-containing aqueous phase is pH-adjusted by adding an alkali base so that a pH value of at least 7.0 is attained. The caffeine is then recovered as a valuable by-product from the aqueous phase by any suitable solidification method.

The caffeine solidification may proceed by any art-recognized procedure. Three such procedures are "freeze-thawing", "precipitating", and "crystallizing". In the freeze-thawing method, the aqueous phase is cooled to a temperature of about 0° C. (32° F.) or below, at which temperature the aqueous phase freezes or solidifies. When this frozen phase is allowed to warm sufficiently to again enter the aqueous phase, a solid crystalline caffeine mass can be separated from the residual aqueous phase. The higher the temperature is allowed to rise, for example to about 21.1° C. (70° F.), the more rapidly crystalline caffeine may be recovered from the residual aqueous phase. However, a lower yield of crystalline caffeine is effected at higher temperatures, and this lost caffeine yield must be balanced against the relative rapidity of processing.

A second method for solidifying caffeine is by the precipitation method, wherein the caffeine-containing aqueous phase is cooled to a temperature as low as about 4.4° C. (40° F.) and neither agitated nor seeded. The caffeine precipitates out at this reduced temperature as an amorphous solid.

A preferred method for solidifying caffeine in the aqueous phase is the crystallization method. Typically, the crystallization of caffeine is conducted at a temperature of from about 1.7° C. (35° F.) to about 7.2° C. (45° F.) with agitation. The agitation is preferred to increase mass transfer which results in more rapid contact of caffeine molecules and faster crystal growth. However, at too high an agitation rate, shearing of the caffeine crystals becomes prevalent and lost caffeine recovery efficiency results.

The solidified caffeine obtained by any of the methods above or any other art-recognized method is separated from the aqueous phase. Typically, centrifugation is employed to recover the solidified caffeine. In the present invention, the recovered caffeine is extremely pure because nearly all of the non-caffeine solids extracted from the aqueous coffee extract have been separately recovered.

EXAMPLE OF THE PRESENT INVENTION

1. A roasted coffee extract, containing about 15% by weight total solids and 0.6% by weight caffeine, was obtained from a countercurrent multi-stage extraction battery having 6 stages and a feed-water temperature of about 180° C. (356° F.).

2. The roasted coffee extract was stripped of its most volatile aromas under 15" vacuum in a plate and frame evaporator and further concentrated in a second evaporation step to 25% soluble solids. The stripped aromas were condensed and pumped to a distillation column where they were fractionated. The more volatile aromas were recovered at the top of the distillation column and retained for addback to the decaffeinated extract prior to spray drying.

3. The stripped roasted coffee extract and methylene chloride were fed to a pilot-scale Karr Column at a weight ratio of 5.8:1 methylene chloride to roasted coffee extract. The operating conditions of the Karr Column included a temperature of 40.6° C. (105° F.), 20 psig pressure, and agitation of 110 spm. The degree of decaffeination was in excess of 98% by weight of the caffeine initially present. The methylene chloride withdrawn from the bottom of the Karr Column contained about 0.26% by weight total solubles and about 0.18% by weight caffeine. The non-caffeine solids were about 0.08% by weight of the exiting methylene chloride stream.

4. The decaffeinated coffee extract was stripped of residual methylene chloride in a flash evaporator. The flash evaporator was of the batch variety and was operated for 60 minutes with the extract at 60° C. (140° F.) and under a vacuum which began at about 5" Hg and gradually increased to about 25" Hg. The coffee extract contained less than 10 ppm methylene chloride after the stripping step.

5. The exiting methylene chloride stream from step 3 was fed to the top of a pilot-scale Karr Column. Water was fed to the bottom of the Karr Column. Both streams were fed at 27° C. (80.6° F.) and the Karr Column was maintained at that same temperature. The ratio was 0.6:1 water to methylene chloride by weight. The Karr Column was agitated at 110 spm. The liquid-liquid contact was sufficient within the Karr Column to partition more than 75% of the non-caffeine solids from the methylene chloride to the exiting water stream while retaining 93% of the available caffeine in the exiting methylene chloride stream. In addition, the purity of the caffeine within the methylene chloride stream was increased from less than 70% pure to more than 90% pure.

6. The water stream containing the vast majority of the non-caffeine solids was stripped of residual methylene chloride in a batch flash evaporator under conditions identical to those in step 4. The water stream stripped of residual solvent and containing the non-caffeine solids was then added to the decaffeinated extract from step 4 such that the ratio of soluble solids to non-caffeine solids in the combined stream was 75:1 by weight.

7. To the combined decaffeinated extract from step 6 was added the more volatile aromas from the distillation column in step 2. This stream was spray dried to a 2.5% moisture.

8. A control sample of spray dried powder was prepared with the more volatile aromas added back prior to spray-drying. It too was decaffeinated with methylene chloride under the same conditions as step 3 but was not combined with recovered non-caffeine solids as in steps 5 and 6.

9. An expert panel determined that the spray-dried powder from step 7 was more full-bodied than the control powder of step 8.

The specific example is illustrative of the invention and is not to be considered as limiting with respect to the proportions, process conditions or as to the equipment that can be used. Modifications and variations may be made within the principles and ranges specified above and set forth in the claims.

What is claimed is:

1. A method for producing a decaffeinated coffee product comprising the steps of:
    (a) contacting an aqueous, caffeine-containing roasted coffee extract with a halogenated caffeine solvent in a liquid-liquid extraction column at a weight ratio of caffeine solvent to extract of from 1:1 to 10:1 at a temperature of from 26.7° C. to 82.2° C. for a time and under conditions effective to transfer at least 90% of the caffeine contained in the extract from the aqueous phase to the caffeine solvent phase, said contact also inherently effecting transfer of a minor amount of non-caffeine roasted coffee solids from the aqueous phase to the caffeine solvent phase, and separating the two phases;
    (b) contacting said caffeine and non-caffeine solids-containing caffeine solvent phase with water in a liquid-liquid extraction column at a weight ratio of water to said caffeine solvent phase of 0.25–3:1, at a temperature of from 5° C. to 43.3° C. and for a time and under conditions effective to transfer at least 70% of the non-caffeine solids from the caffeine solvent phase to the water phase while retaining at least 90% of the caffeine in the caffeine solvent phase, and separating the two phases;
    (c) combining the decaffeinated aqueous coffee extract phase from step (a) and the non-caffeine solids-containing water phase from step (b); and
    (d) removing entrained solvent from the separate aqueous and water phases or the combined liquid of step (c) in order to effect a residual solvent content in the combined liquid of less than 10 ppm.

2. A method for producing a decaffeinated coffee product as specified in claim 1 wherein said halogenated coffeine solvent is methylene chloride.

3. A method for producing a decaffeinated coffee product as specified in claim 1 which further comprises stripping the roasted coffee extract of volatile aromas under 5" Hg to 27" Hg and at a temperature of between 43.3° C. and 96.1° C. prior to contacting the roasted coffee extract with the caffeine solvent, and adding back the stripped volatile aromas to a decaffeinated extract.

4. A method for producing a decaffeinated coffee product as specified in claim 1 which further comprises drying the combined decaffeinated liquid stream of step (d) to form a soluble coffee product.

5. A method for producing a decaffeinated coffee product as specified in claim 1 which further comprises aseptically packaging the combined decaffeinated liquid stream of step (d).

* * * * *